April 21, 1959   J. L. DE LA PARRA CLARK   2,882,985
VEHICLE PARKING DEVICE

Filed Sept. 6, 1955   3 Sheets—Sheet 1

INVENTOR.
JORGE LUIS DE LA PARRA CLARK
BY Robert G. Mentag
ATTORNEY

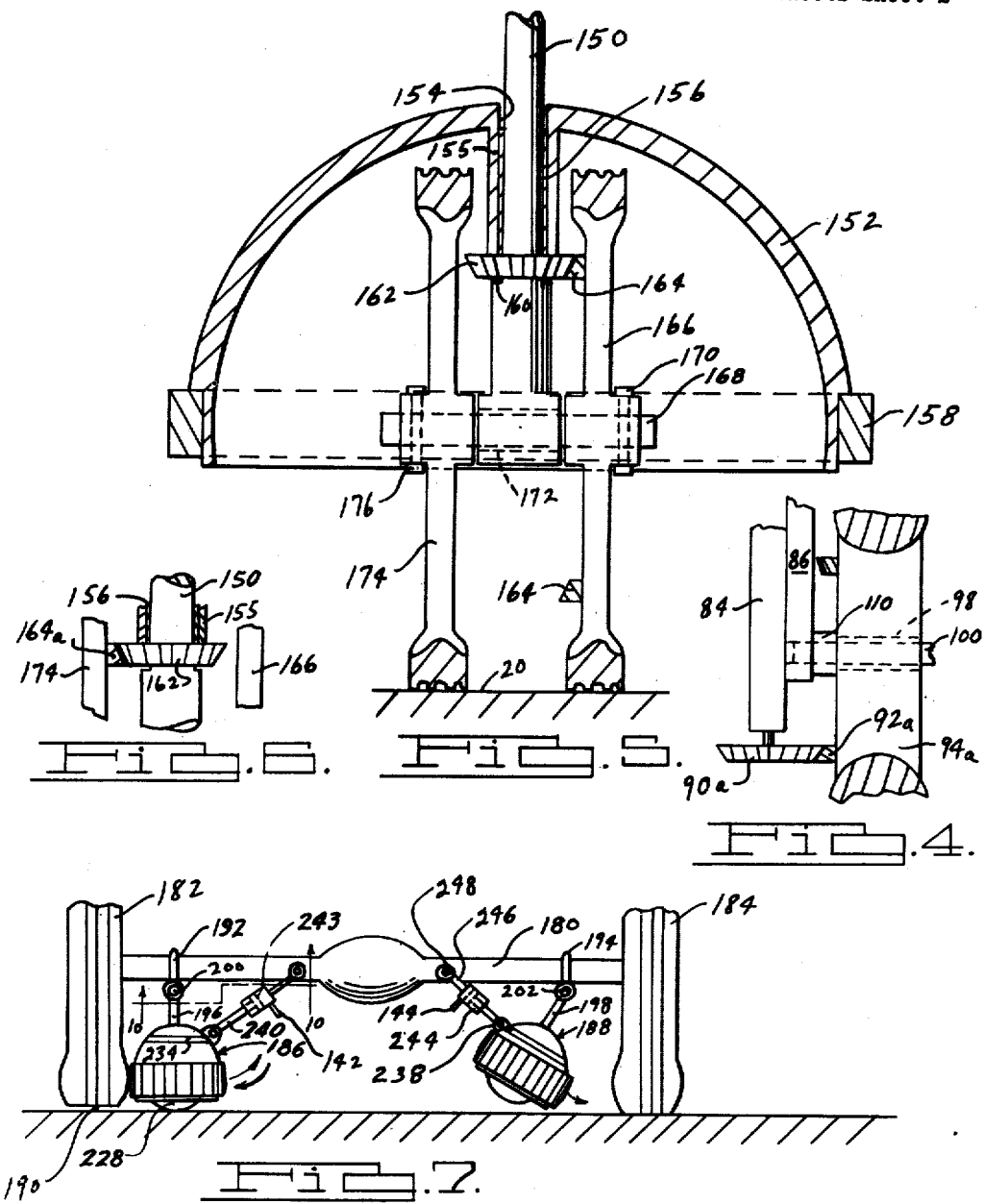

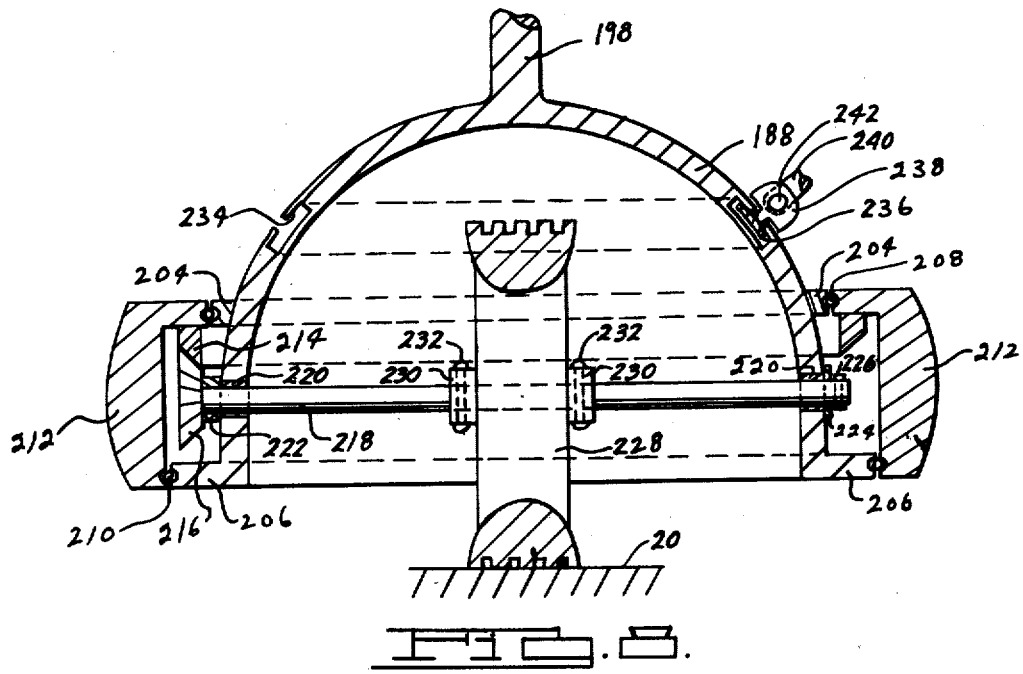
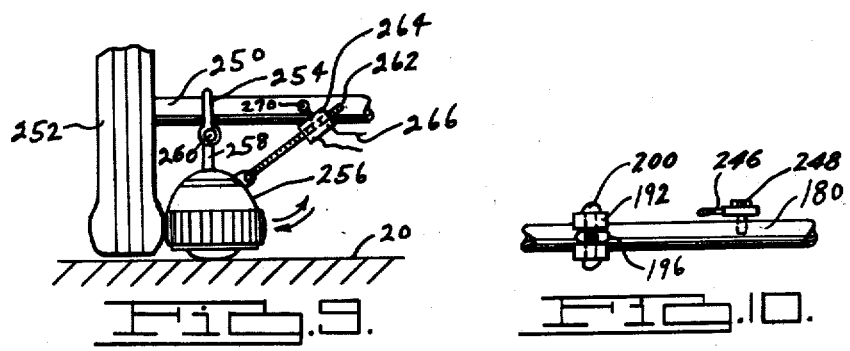

United States Patent Office
2,882,985
Patented Apr. 21, 1959

2,882,985
VEHICLE PARKING DEVICE

Jorge Luis de la Parra Clark, Detroit, Mich., assignor of one-half to Robert G. Mentag, Detroit, Mich.

Application September 6, 1955, Serial No. 532,389

3 Claims. (Cl. 180—1)

This invention relates to a vehicle parking device, and, more particularly, to a vehicle parking device which may be adapted for use on automobiles and trucks of all types, and which permits the operator of a vehicle equipped with such a device to park the vehicle in a minimum of parking space.

At the present time, with the increased production and use of automobiles, the problem of providing sufficient parking space has arisen in the congested areas of cities. Accordingly, it is the primary object of this invention to provide a vehicle parking device which will permit the use of smaller parking spaces for vehicles, whereby, it will be possible to park more vehicles in the present parking areas.

It is another object of this invention to provide a vehicle parking device which may be attached to the rearward end of a vehicle, whereby, the operator of the vehicle may nose the forward end of the vehicle into a small parking area, and then operate the parking device to swing the rearward end of the vehicle into the parking area to complete the parking operation.

It is a further object of this invention to provide a vehicle parking device which is adapted to permit the operator of a vehicle to park the vehicle quickly and efficiently.

It is a still further object of this invention to provide a vehicle parking device comprising a pair of parking wheels adapted to be mounted on the back end of a vehicle; power means for moving said pair of wheels into engagement with the ground and for elevating the back end of the vehicle above the ground; and, means for transmitting power from the drive wheels of the vehicle to said pair of parking wheels for moving the back end of the vehicle sideward into a parking space.

It is a still further object of this invention to provide a vehicle parking device of this class which will be simple of structure, economical of manufacture, durable and compact, and highly efficient in use.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 4 is a fragmentary view, of the structure illustrated in Fig. 3, but adapted for use on the left rear wheel of a vehicle;

Fig. 5 is an elevational view, partly in section, and similar to Fig. 3, of a modification of the invention;

Fig. 6 is a fragmentary view, of the structure illustrated in Fig. 5, but adapted for use on the left rear wheel of a vehicle;

Fig. 7 is a partial rear end elevational view of the drive wheels, axle and differential of a vehicle provided with another embodiment of the invention;

Fig. 8 is an elevational view, partly in section, similar to Fig. 3, of another modification of the invention;

Fig. 9 is a partial elevational view of structure similar to that shown in Fig. 7, showing a further embodiment of the invention; and, Fig. 10 is a partial view of the structure illustrated in Fig. 7, taken along the line 10—10 thereof.

Figures 1, 2, 3:
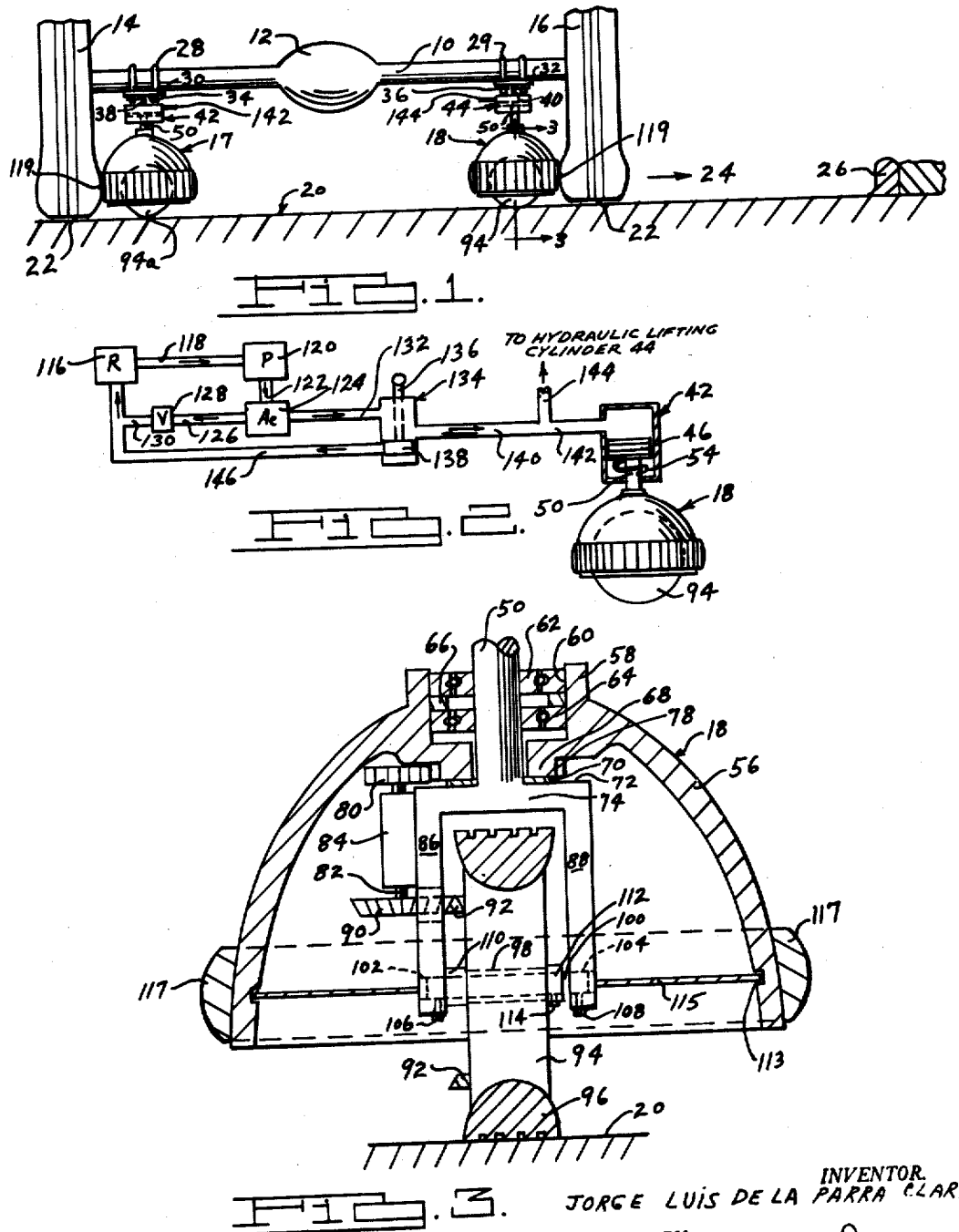
Fig. 1 is a partial rear end elevational view of the drive wheels, axle and differential of a vehicle provided with an embodiment of the invention.
Fig. 2 is a schematic view of the embodiment illustrated in Fig. 1, showing a control system for this embodiment.
Fig. 3 is an enlarged elevational view, partly in section, of the structure illustrated in Fig. 1, taken along the line 3—3 thereof.

Before explaining in detail the present invention, it is to be understood, that the invention is not limited in its application to the details of construction and arrangement of parts illustrated in the accompanying drawings, since the invention is capable of other embodiments and of being practiced or carried out in various ways. Also, it is to be understood, that the phraseology and terminology employed herein is for the purpose of description and not limitation.

In the drawings, the numeral 10 designates the rear drive axle of a vehicle which is driven by a conventional engine through the usual differential 12. Mounted on the drive axle 10, by the usual means is the left and right drive wheels 14 and 16, respectively. A vehicle parking device made in accordance with the principles of the invention is generally indicated by the numerals 17 and 18, and is adapted to raise the vehicle from the ground 20 a slight distance, as indicated by the numeral 22, and move the rearward end of the vehicle in a sideward direction, as indicated by the arrow 24, against the curb 26.

The numerals 28 and 29 represent pairs of downwardly facing U-shaped bolts which fit around the axle 10 and are adapted to have secured thereon the plates 30 and 32, respectively, by means of the nuts 34 and 36. Fixedly secured to each of the plates 30 and 32, by any suitable means, as by welding, is a downwardly extending supporting member, as 38 and 40, respectively, which are fixed to the hydraulic cylinders 42 and 44. Since both of the hydraulic cylinders and the structure carried thereby are substantially the same, only one of the parking lifting and moving devices will be fully described.

The hydraulic cylinders 42 and 44 are each provided with a piston 46 carrying a rod 50 which extends downwardly through a suitable aperture in the lower wall of the cylinder. The piston 46 is adapted to be biased upwardly to a normal upward position, by means of the spring 54 which is mounted in the cylinder below the piston 46, and to be moved downwardly by fluid pressure, as explained more fully hereinafter.

As is shown in Fig. 3, the rod 50 is adapted to have rotatably mounted thereon a substantially hemispherically shaped carrier 56 provided with an integral collar 58 which forms an annular space 60, between the rod 50 and the carrier 56. The carrier collar 58 is rotatably supported by the rod 50 by means of the bearing members 62 and 64, which are spaced apart by the spacing member 66. The carrier 56 is provided with an inwardly extending annular portion 68, which is adapted to engage the thrust bearing 70 disposed on the shoulder 72 on the cross member 74, which is integrally mounted on the lower end of the rod 50. Integral with the shoulder portion 68 is a drive gear 78 which meshes with and drives the spur gear 80 carried on the top of the shaft 82, which is rotatably mounted in the housing 84. The housing 84 is adapted to be fixedly mounted on the leg 86, by any suitable means, as by welding. As shown in Fig. 3, the depending leg 86 is mounted on one end of the cross member 74, and, a second depending leg 88 is mounted on the other end of the cross member 74.

Fixedly mounted on the lower end of the shaft 82 is a bevel drive gear 90 which meshably engages a mating bevel ring gear 92 mounted on one side of a wheel 94, which is provided with a suitable solid rubber tire 96. It will be seen that in the structure shown in Fig. 3, the gear 90 drives the ring gear 92 at the top of the wheel 94, so as to give the proper rotation to the wheel 94, when the structure of Fig. 3 is mounted to coact with the right rear wheel 16 of the vehicle. Fig. 4 shows the gear 90a disposed to contact the ring gear 92a near the bottom of the wheel 94a, so as to give the proper rotation to the wheel 94a, when the structure of Fig. 3 is modified to be mounted to coact with the left rear wheel 14 of the vehicle. The wheel 94 is rotatably mounted on the shaft 100, by means of the sleeve bearing 98. The shaft 100 is adapted to be mounted in the apertures 102 and 104 in the lower ends of the depending legs 86 and 88, respectively, and to be suitably fixed in said apertures, as by means of the retaining screws 106 and 108, respectively. The wheel 94 may be centered on the shaft 100, as by means of the spacing bearing 110, and the collar 112 which is locked in position by the retaining screw 114. An annular groove 113 is provided in the inner surface of the lower end of the carrier 56, in which a suitable dust shield 115 may be mounted and formed around the wheel 94 and the arms 86 and 88. As shown in Fig. 3, the carrier 56 is provided on the lower outer surface with a suitable ring member 117, made from rubber or the like, which is adapted to frictionally engage the sides of the tires on the drive wheels 14 and 16, as at 119.

As shown in Fig. 2, an illustrative hydraulic circuit for actuating the hydraulic cylinders 42 and 44 would comprise a fluid reservoir 116, connected by the conduit 118 to a suitable hydraulic pump 120. The pump 120 is connected by means of the conduit 122 to an accumulator 124 which is connected by means of the conduit 126 to a pressure relief valve and thence to the reservoir 116 by means of the conduit 130. The accumulator 124 is also connected by means of the conduit 132 to a control valve 134 which is provided with a rod 136 affixed to a piston or valve spool 138. A conduit 140 is connected to the valve 134 and is connected to the conduits 142 and 144 which are connected to the hydraulic cylinders 42 and 44, respectively. The valve 134 is also provided with a return conduit 146 for conducting fluid back to the reservoir 116.

In the practice of the invention, a vehicle provided with the invention as shown in Figs. 1 through 3, would first have its front end directed into the parking space, leaving the rear end of the vehicle to be moved into the parking space. The operator could accomplish this by moving the valve rod 136 so as to have the piston 138 block the return line 146, whereby, fluid may be pumped from the pump 120 through the conduit 122, the accumulator 124, conduit 132, valve 134, conduit 138, and thence to the conduits 142 and 144 which feed the fluid under pressure into the hydraulic cylinders 42 and 44. The pistons 46 in each of the hydraulic cylinders 42 and 44 will be actuated downwardly against the spring 54, and the wheels 94 and 94a will be moved into contact with the ground 20. Continued movement of the pistons 46 will lift the vehicle wheels 14 and 16 off the ground as indicated by the numerals 22. As the parking devices 17 and 18 are lowered, the friction rings 117 will be forced into engagement with the sides of the tires on the wheels 14 and 16.

The operator may, at this point, move the rear end of the vehicle sideward, in the direction of the arrow 24, towards the curb 26, by putting the vehicle in gear and actuating the drive wheels 14 and 16 in the forward direction, that is, by moving the drive wheels in the direction which would normally move the vehicle forwardly. As viewed from the left side of the structure of Fig. 1, the wheel 14 would move counter-clockwise; the carrier 56 of unit 17 would rotate counter-clockwise, as viewed from the top; the gear 78 of unit 17 would also turn counter-clockwise; gears 80 and 90a of unit 17 would turn clockwise; and gear 90a would turn 92a clockwise, as viewed from the rear of the vehicle, whereby wheel 94a will be moved toward the curb 26. Since the unit 18 engages the wheel 16 on the left side, instead of the right, as in the case of wheel 14, the rotation of the various parts will be the opposite to that of unit 17. The wheel 94 will, however, be also rotated clockwise, as viewed from the rear of the vehicle, since the gear 90 drives the ring gear 92 at a point near the top of the wheel 94, which is the opposite of the driving contact for wheel 94a.

The rear end of the vehicle may be moved out of the parking space, by merely putting the vehicle in reverse, which causes the drive wheels 14 and 16 to be reversed in their action, and, accordingly, the parking and driving units 17 and 18. The parking units 17 and 18 may be actuated upwardly by moving the control valve 134 to the upper position so as to cover the conduit 132 and uncover the exhaust line 146 to permit the fluid in the cylinders 42 and 44 to return to the reservoir 116. As the fluid leaves the cylinders 42 and 44, the return spring 54 will move the pistons 46 upwardly into the storage position.

It will be understood, that although the parking units 17 and 18 are illustrated as being large in comparison to the wheels 14 and 16, these units may, in practice, be made to any desired size, in accordance with the weight and size of the vehicle to be provided with the invention. It will also be understood, that the hydraulic cylinders 42 and 44 may be fluid operated upwardly as well as downwardly.

Figs. 5 and 6 show a modification of the invention involving a second type wheel structure which includes a rod 150 similar to the rod 50 of the species of Fig. 1, and which may be suitably secured to the piston of a hydraulic cylinder, and used in the same manner as the embodiment of Fig. 1. Rotatably mounted on the rod 150 is a substantially hemispherically shaped carrier 152 provided with an axial aperture 154 from which extends inwardly a sleeve 155 which is journaled on the rod 150 by means of the sleeve bearing 156. The carrier 152 is provided with a fixedly mounted friction ring 158 for engaging the side of the tires of a vehicle to be parked and for rotating the carrier. The rod 150 is enlarged on the lower end thereof to provide a shoulder 160 on which is supported a bevel drive gear 162 which is fixedly mounted on the lower end of the sleeve 155 by any suitable means. Suitable bearing means may be provided between the shoulder 160 and the drive gear 162.

The drive gear 162 is adapted to meshably engage a ring gear 164 fixedly mounted on the inside of a wheel 166 which is fixedly secured to the shaft 168, by means of the bolt 170, or other suitable means. The shaft 168 is rotatably mounted in the sleeve bearing 172 which is mounted in an aperture in the lower end of the rod 150. A second wheel 174 is fixedly mounted on the other end of the shaft 168 by means of the bolt 176. The structure shown in Fig. 5 is adapted for use on the right rear wheel of a vehicle. In order to adapt this modification for use on the left rear vehicle wheel, the ring gear 164 would be mounted on the other wheel 174, as shown in Fig. 6 and as marked by the numeral 164a. In use, the modified structure of Figs. 5 and 6 would be used in a manner similar for the same structure shown in Fig. 1.

Figs. 7, 8 and 10 disclose a second embodiment of the invention in which the numeral 180 indicates the rear drive axle of a vehicle which is operatively connected, by the usual means, to the left wheel 182 and right wheel 184. In the use of this embodiment, the parking wheel structures, generally indicated by the numerals 186 and 188, are engaged with the drive wheels of the vehicle one at a time, as illustrated in Fig. 7, whereby, each drive wheel is separately lifted a distance 190 off the ground before the parking device is actuated. The parking wheel structures 186 and 188 are carried on the axle 180 by means of the U-shaped supported members 192 and 194 which hingedly support the rods 196 and 198, by suitable pivot pins, as 200 and 202.

Since the wheel structures 186 and 188 are similar, only one will be described in detail. As shown in Fig. 8, the supporting rod 198 is fixed to a hemispherically shaped carrier 188 which has an outwardly extending projection 204 therearound and which has an outwardly extending flange on the lower end thereof, as 206. Rotatably mounted on the projection 204 and the flange 206, by means of the bearings 208 and 210, is an annular friction member 212 for engaging the sides of a vehicle tire. The friction member 212 is spaced from the carrier and carries therebetween a ring gear 214, adapted to meshably engage a bevel gear 216 which is suitably fixed to a wheel shaft 218 which is mounted in the carrier in the sleeve bearings 220. The driven gear 216 is spaced from the carrier by means of the thrust washer 222. The other end of the shaft 218 is fixed in place in the carrier by means of the washer 224 and the lock pin 226. Centrally mounted on the shaft 218 is a wheel 228 which is provided with hubs 230, which are locked in place by the lock pins 232.

The carrier is provided with an annular T-slot on the upper portion thereof, as 234, in which is slidably mounted a member 236 which carries a lug 238 to which is hingedly connected a rod 240, by means of a suitable pivot pin, as 242. As shown in Fig. 7, the rods 240 are connected to the piston of hydraulic cylinders, as 243 and 244, which are similar to the cylinders 42 and 44 of the embodiment of Fig. 1. The hydraulic cylinders 243 and 244 are carried by rods 246 which are pivotally mounted on the axle 180, as by the pivot pin 248.

In the practice of the invention, the left wheel 182 of the vehicle would first be lifted by actuating the cylinder 243, by means of a hydraulic control system as shown for the embodiment of Fig. 1. In the inoperative position, the hydraulic cylinders 243 and 244 would be actuated to swing the wheel structures 186 and 188 inwardly and upwardly into a suitable storage position. When in use, the cylinder 243 is first actuated, the wheel structure 186 would rotate on the pin 200 and into engagement with the ground 20. Continued actuation of the cylinder 243 would cause the wheel 228 to rotate and the wheel structure to move against the wheel 182, and, in so doing, raise the wheel 182 above the ground as indicated at 190. The other wheel 184 would still be in contact with the ground and would act as a brake while the left wheel is raised. The other cylinder 244 is then actuated to swing the wheel structure 188 into place and lift the right wheel 184. Since the wheels 228 are disposed transverse to the drive wheels, this aforegoing action is possible. After the two wheel structures have been actuated into position, the vehicle drive wheels will drive the parking wheels in a manner to that of the embodiment of Fig. 1. The structure shown in Fig. 8 would be located for correction movement on the right side of the vehicle so as to get the proper rotation towards a curb when the wheels of a vehicle are actuated in the normal forward direction. The wheel structure 186 for the left wheel 182 would merely have the driven gear 216 located on the right end of the shaft 218, as viewed in Fig. 8.

It will be obvious, that the wheel structures of Figs. 3 and 5 could be used in the embodiment of Fig. 7, but they would have to be provided with the T-slot 234 and the slider 236 and its related structure so as to permit the carriers to rotate.

Fig. 9 illustrates a slight modification of the embodiment of Fig. 7, in which the axle of the vehicle is indicated by the numeral 250, and the left rear wheel by the numeral 252. A U-shaped supporting member 254 carries the wheel structure 256, which could be either of the type shown in Figs. 3, 5 or 8. The wheel structure 256 is carried by the rod 258 which is hingedly mounted on the member 254 by the pin 260. The wheel structure 256 is pivoted into and out of position by means of a threaded shaft 262 which is adapted to be actuated by a suitable electric motor 264 connected to a suitable power source by the wires 266. The threaded shaft 262 is hingedly connected to the wheel structure 256 in a manner similar to that of the shaft 240 in Fig. 8. The motor 264 is hingedly connected to the axle 250, as by the pin 270. The specie shown in Fig. 9 would eliminate the need for a hydraulic cylinder and a hydraulic control system. The electric motor 264 may be any suitable motor, preferably formed with a hollow threaded shaft whereby, the threaded shaft 262 would move forwardly and backwardly through the motor.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A parking device in an automotive vehicle having a chassis including engine driven rear wheels with tires, comprising: a pair of carriers swingably mounted on said chassis about horizontal axes disposed substantially longitudinally of the chassis between and near the rear wheels, respectively; a pair of vertically spaced annular outwardly extending projections fixedly mounted on each of said carriers; a horizontally disposed friction ring rotatably mounted on said pair of annular projections on each of said carriers; power means mounted on said chassis and connected to said carriers for swinging said carriers into an operative and into an inoperative position; said friction rings being moved into and from frictional driving engagement with the side walls of the tires on the adjacent rear wheels, respectively, on moving of said carriers into said operative and inoperative positions, respectively; a horizontal shaft rotatably mounted on each carrier and being disposed substantially longitudinally of the chassis and with at least one end of said shaft extending outwardly of the carrier between the annular projections on the carrier; a ground engaging wheel fixedly mounted on each of the horizontal shafts and adapted to extend below the lower end of the vehicle rear wheels when the carriers are in said operative positions so as to raise the vehicle rear wheels off the ground; a drive gear carried by each of the friction rings on the inner side thereof; and, a gear fixedly mounted on each of the shaft ends extending between the annular projections on each of the carriers and being drivably connected to the respective drive gear on the friction ring carried by each carrier.

2. The invention as set forth in claim 1, wherein: said power means includes a pair of piston and rod type hydraulic motors hingedly mounted on the chassis inwardly of the carriers; and each of the rods of said motors are hingedly connected to one of said carriers.

3. The invention as set forth in claim 1, wherein said power means includes a pair of threaded screws; an electric motor threadably engaging each of said screws for moving it forwardly and backwardly; each of said motors being hingedly mounted to said chassis; and, each of said screws being hingedly connected to one of said carriers.

References Cited in the file of this patent

UNITED STATES PATENTS

| | | |
|---|---|---|
| 1,513,282 | Sheets | Oct. 28, 1924 |
| 2,165,461 | Dreisbach | July 11, 1939 |
| 2,364,553 | Rische | Dec. 5, 1944 |
| 2,746,554 | Matthews | May 22, 1956 |
| 2,751,989 | Dreisbach | June 26, 1956 |

FOREIGN PATENTS

| | | |
|---|---|---|
| 1,044,118 | France | June 17, 1953 |